(12) United States Patent
Lee

(10) Patent No.: US 8,807,186 B1
(45) Date of Patent: Aug. 19, 2014

(54) HOT LAMINATING APPARATUS

(71) Applicant: Primax Electronics Ltd., Taipei (TW)

(72) Inventor: Yen-Te Lee, Taipei (TW)

(73) Assignee: Primax Electronics Ltd., Neihu (TW)

( * ) Notice: Subject to any disclaimer, the term of this patent is extended or adjusted under 35 U.S.C. 154(b) by 0 days.

(21) Appl. No.: 13/959,813

(22) Filed: Aug. 6, 2013

(30) Foreign Application Priority Data

Apr. 7, 2013 (CN) .......................... 2013 1 0117195

(51) Int. Cl.
*B32B 37/00* (2006.01)
*B32B 37/14* (2006.01)

(52) U.S. Cl.
CPC ......... *B32B 37/0046* (2013.01); *B32B 37/0053* (2013.01); *B32B 37/142* (2013.01)
USPC .............................. 156/499; 156/555; 156/582

(58) Field of Classification Search
USPC ....................... 156/499, 555, 580, 582, 583.1; 100/327, 155 R, 160, 176
See application file for complete search history.

(56) References Cited

U.S. PATENT DOCUMENTS

| | | | |
|---|---|---|---|
| 3,943,031 A * | 3/1976 | Krueger et al. ............. | 156/583.1 |
| 5,707,481 A * | 1/1998 | Takeda et al. .................. | 156/555 |
| 7,867,347 B2 * | 1/2011 | Lee ................................. | 156/64 |
| 7,992,617 B1 * | 8/2011 | Lee et al. ........................ | 156/499 |
| 8,104,526 B2 * | 1/2012 | Pan et al. ........................ | 156/359 |
| 8,403,015 B2 * | 3/2013 | Bradley et al. ................. | 156/359 |
| 8,517,080 B2 * | 8/2013 | Fujishima et al. .......... | 156/583.5 |
| 2006/0162841 A1 * | 7/2006 | Hong .............................. | 156/64 |

* cited by examiner

*Primary Examiner* — James Sells
(74) *Attorney, Agent, or Firm* — Kirton McConkie; Evan R. Witt

(57) ABSTRACT

A hot laminating apparatus includes a first pressing roller, a second pressing roller, a first heating element, and a first bimetallic structure. The first bimetallic structure is arranged between the first heating element and the first pressing roller. The first heating element is used for providing heat energy to the first pressing roller. As the ambient temperature changes, the first bimetallic structure is subjected to deformation to allow the first heating element to be away from the first pressing roller or allow the first heating element to be close to the first pressing roller.

12 Claims, 5 Drawing Sheets

HOT LAMINATING APPARATUS

FIELD OF THE INVENTION

The present invention relates to a hot laminating apparatus, and more particularly to a hot laminating apparatus for laminating two thermoplastic films and a sheet article between the two thermoplastic films.

BACKGROUND OF THE INVENTION

In our daily lives, a hot laminating apparatus (also referred as a laminator) is widely used for protecting a sheet article such as a document or a photo. After a sheet article is sandwiched between two thermoplastic films, the sheet article and the two thermoplastic films are fed into the laminator, and the sheet article and the two thermoplastic films are hot pressed (or laminated) by the laminator. Consequently, two protective films are formed on both surfaces of the sheet article in order to protect the sheet article.

FIG. 1 is a schematic view illustrating a conventional hot laminating apparatus. As shown in FIG. 1, the hot laminating apparatus 1 comprises a heating mechanism 10, two pressing rollers 11 and a transmission channel 12. The heating mechanism 10 is used for transforming electricity into heat energy. The heat energy generated by the heating mechanism 10 is transferred to the pressing rollers 11 through air in order to heat up the pressing rollers 11. When a sheet article sandwiched between an upper thermoplastic film and a lower thermoplastic film (not shown) is fed into the hot laminating apparatus 1 through an entrance of the transmission channel 12, the pressing rollers 11 which have been heated up by the heat energy may laminate these two thermoplastic films. Since the two thermoplastic films are heated and softened, the sheet article can be fixed between the two thermoplastic films.

For enhancing the laminating efficacy, the hot laminating apparatus 1 should be adjusted to a proper laminating temperature according to the thickness of the sheet article to be laminated. If the sheet article to be laminated is too thick, it is required to take a long time for waiting the pressing rollers 11 to heat up a corresponding preheating temperature. After the pressing rollers 11 are heated to the preheating temperature, the two thermoplastic films and the sheet article between these two thermoplastic films can be fed into the transmission channel 12 to be laminated by the pressing rollers 11. In other words, the operations of the conventional hot laminating apparatus 1 are not user-friendly. Therefore, it is an important issue to research how to shorten the preheating time of the conventional hot laminating apparatus 1.

Moreover, after the two thermoplastic films and the sheet article between these two thermoplastic films are introduced into the transmission channel 12, at least one of the two pressing rollers 11 is shifted. Consequently, the two pressing rollers 11 are separated from each other by a gap. The gap is substantially equal to the overall thickness of the two thermoplastic films and the sheet article. In such way, the two thermoplastic films and the sheet article can be transmitted through the region between the two pressing rollers 11, and the two thermoplastic films and the sheet article can be clamped by the two pressing rollers 11 collaboratively. For preventing the shifted pressing roller 11 from compressing the heating mechanism 10, it is necessary to have a sufficient spacing distance D between the installation position of the heating mechanism 10 and the installation position of each pressing roller 11. That is, the spacing distance D should be larger than a maximum distance that the pressing roller 11 can be shifted.

However, the applicants found that the heat energy generated by the heating mechanism 10 fails to be effectively transferred to the pressing rollers 11 because the spacing distance D between the heating mechanism 10 and the pressing roller 11 is usually too large. This is also the reason why the heating time of the conventional hot laminating apparatus 1 fails to be effectively shortened. Therefore, there is need of providing a hot laminating apparatus with a faster preheating speed and preventing the shifted pressing roller 11 from compressing the heating mechanism 10.

SUMMARY OF THE INVENTION

The present invention provides a hot laminating apparatus with an enhanced preheating speed and reduced cost.

In accordance with an aspect of the present invention, there is provided a hot laminating apparatus. The hot laminating apparatus includes a main body, a first pressing roller, a second pressing roller, at least one first heating element, at least one first heating element, and at least one first bimetallic structure. The main body includes a first frame and a second frame, wherein the first frame and the second frame are opposed to each other. Two ends of the first pressing roller are pivotally coupled to the first frame and the second frame, respectively. The second pressing roller is opposed to the first pressing roller. Two ends of the second pressing roller are pivotally coupled to the first frame and the second frame, respectively. The first pressing roller and the second pressing roller are rotated in reverse directions. When two thermoplastic films and a sheet article between the two thermoplastic films are transmitted through a region between the first pressing roller and the second pressing roller, the two thermoplastic films and the sheet article are laminated by the first pressing roller and the second pressing roller. The at least one first heating element is located beside the first pressing roller for providing heat energy to the first pressing roller. The at least one first bimetallic structure is arranged between the at least one first heating element and the first pressing roller. In response to the heat energy provided by the at least one first heating element, the at least one first bimetallic structure is subjected to deformation to allow the at least one first heating element to be away from the first pressing roller.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
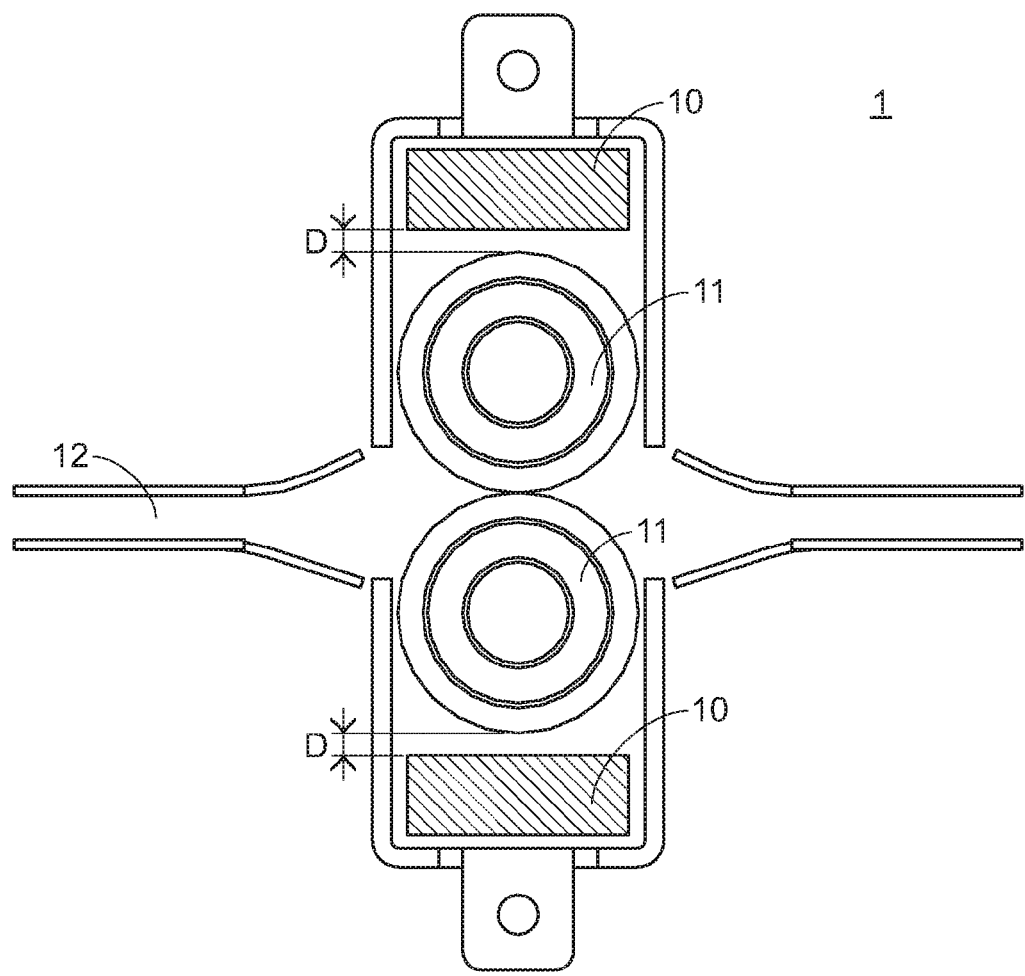
FIG. 1 is a schematic view illustrating a conventional hot laminating apparatus.
Figure 2:
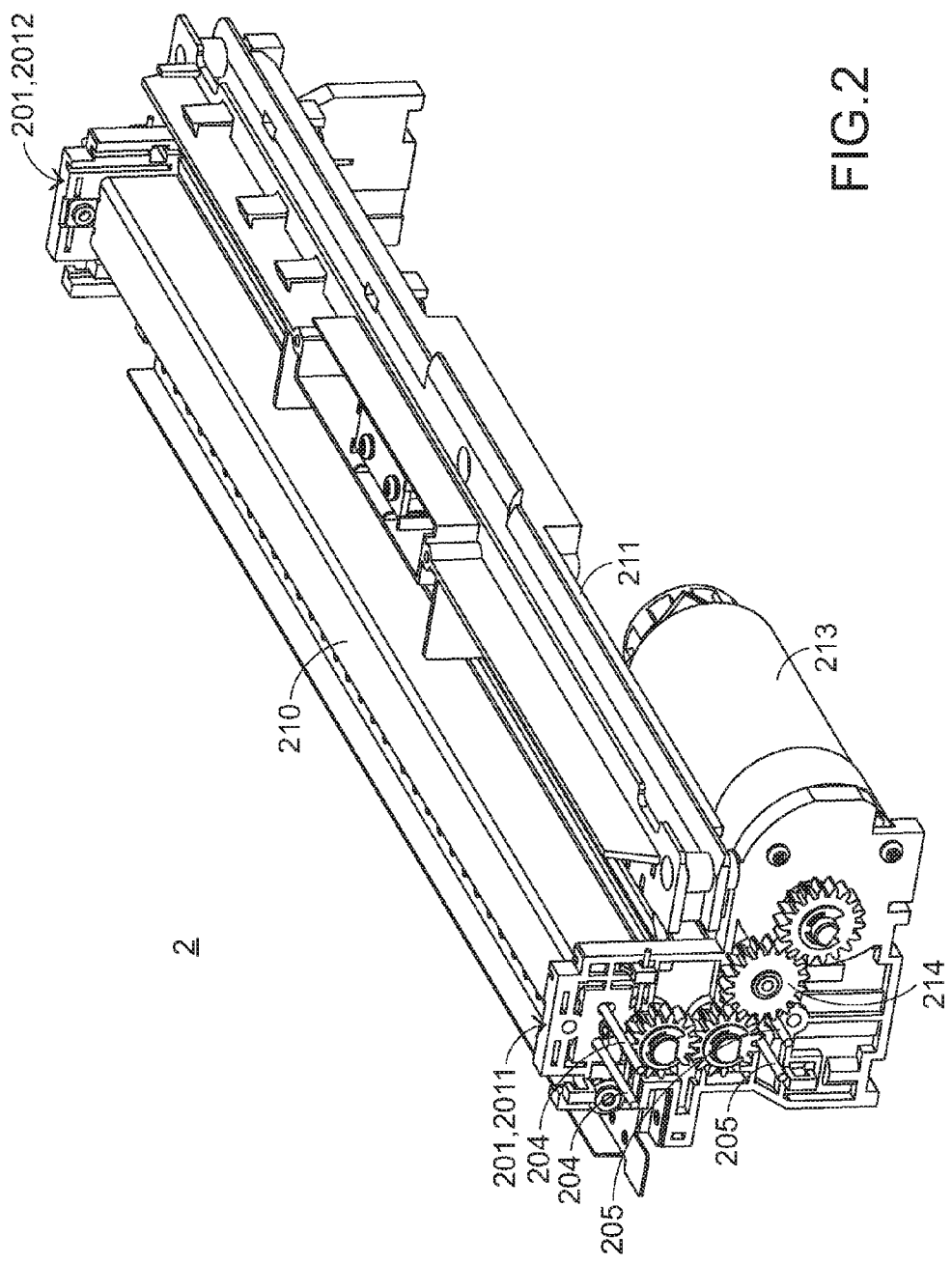
FIG. 2 is a schematic perspective view illustrating a hot laminating apparatus according to an embodiment of the present invention.
Figure 3:
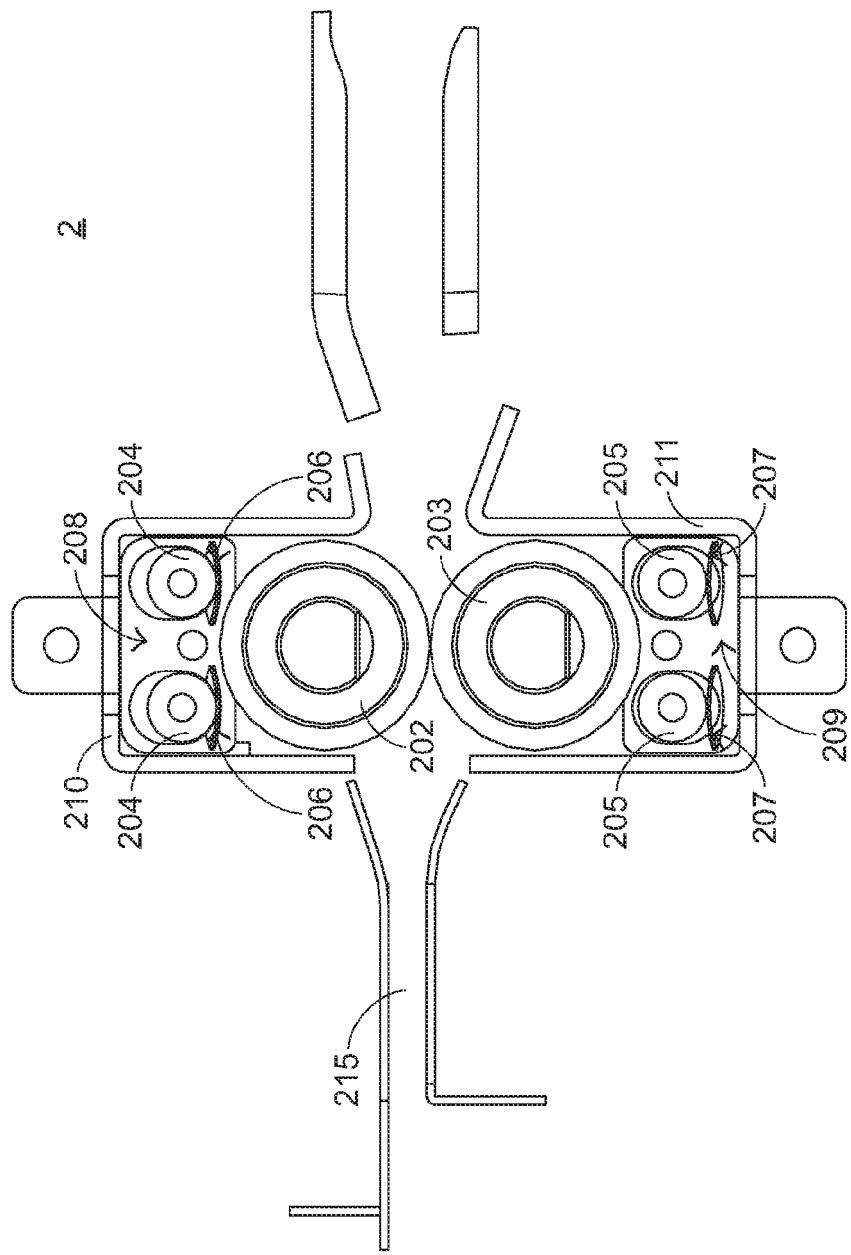
FIG. 3 is a schematic side view illustrating a portion of the hot laminating apparatus of FIG. 2.

FIG. 2 is a schematic perspective view illustrating a hot laminating apparatus according to an embodiment of the present invention. FIG. 3 is a schematic side view illustrating a portion of the hot laminating apparatus of FIG. 2. Please refer to FIGS. 2 and 3. For clarification and brevity, some components (e.g. a main body, a driving motor, a drive gear set and other components) are not shown in FIG. 3.

The hot laminating apparatus 2 comprises a main body 201, a first pressing roller 202, a second pressing roller 203, two first heating elements 204, two second heating elements 205, four first bimetallic structures 206, four second bimetallic structures 207, two first brackets 208, two second brackets 209, a first heat shield 210, a second heat shield 211, a driving motor 213, a drive gear set 214, and a transmission channel 215. The main body 201 comprises a first frame 2011 and a second frame 2012, wherein the first frame 2011 and the second frame 2012 are opposed to each other. The first pressing roller 202 and the second pressing roller 203 are opposed to each other. Two ends of the first pressing roller 202 are pivotally coupled to the first frame 2011 and the second frame 2012, respectively. Similarly, two ends of the second pressing roller 203 are pivotally coupled to the first frame 2011 and the second frame 2012, respectively. Moreover, the transmission channel 215 is arranged between the first pressing roller 202 and the second pressing roller 203.

In this embodiment, the two first heating elements 204 and the two second heating elements 205 are heat pipes. The two first heating elements 204 are located near a top side of the first pressing roller 202. The two second heating elements 205 are located near a bottom side of the second pressing roller 203. Moreover, each of the first heat shield 210 and the second heat shield 211 has an inverted-U shape. The two first heating elements 204 and a part of the first pressing roller 202 are enclosed by the first heat shield 210. The two second heating elements 205 and a part of the second pressing roller 203 are enclosed by the second heat shield 211. Consequently, the heat energy generated by the two first heating elements 204 and the two second heating elements 205 are not easily dissipated away to the surroundings. In particular, since the opening part of the first heat shield 210 faces the first pressing roller 202, a great portion of the heat energy generated by the two first heating elements 204 can be transferred to the first pressing roller 202. Similarly, since the opening part of the second heat shield 211 faces the second pressing roller 203, a great portion of the heat energy generated by the two second heating elements 205 can be transferred to the second pressing roller 203.

The driving motor 213 is used for providing motive power to drive the drive gear set 214 in order to further drive rotations of the first pressing roller 202 and the second pressing roller 203. The rotating direction of the first pressing roller 202 and the rotating direction of the second pressing roller 203 are reverse to each other. When a sheet article sandwiched between an upper thermoplastic film and a lower thermoplastic film (not shown) is fed into the hot laminating apparatus 2 through an entrance of the transmission channel 215, at least one of the first pressing roller 202 and the second pressing roller 203 which has been heated up by the heat energy will be shifted. Consequently, the first pressing roller 202 and the second pressing roller 203 are separated from each other by a gap. For example, only the first pressing roller 202 is shifted upwardly, or only the second pressing roller 203 is shifted downwardly, or the first pressing roller 202 and the second pressing roller 203 are respectively shifted upwardly and downwardly. In such way, the two thermoplastic films and the sheet article can be transmitted through the region between the first pressing roller 202 and the second pressing roller 203, and the two thermoplastic films and the sheet article can be clamped by the first pressing roller 202 and the second pressing roller 203 collaboratively. Under this circumstance, these two thermoplastic films are laminated by the first pressing roller 202 and the second pressing roller 203. Since the two thermoplastic films are heated and softened, the sheet article can be fixed between the two thermoplastic films.

In accordance with the features of the present invention, the two first heating elements 204 may be shifted toward the first pressing roller 202 or away from the first pressing roller 202 according to the temperature change of the positions near the two first heating elements 204; and the two second heating elements 205 may be shifted toward the second pressing roller 203 or away from the second pressing roller 203 according to the temperature change of the positions near the two second heating elements 205.

Figure 4:
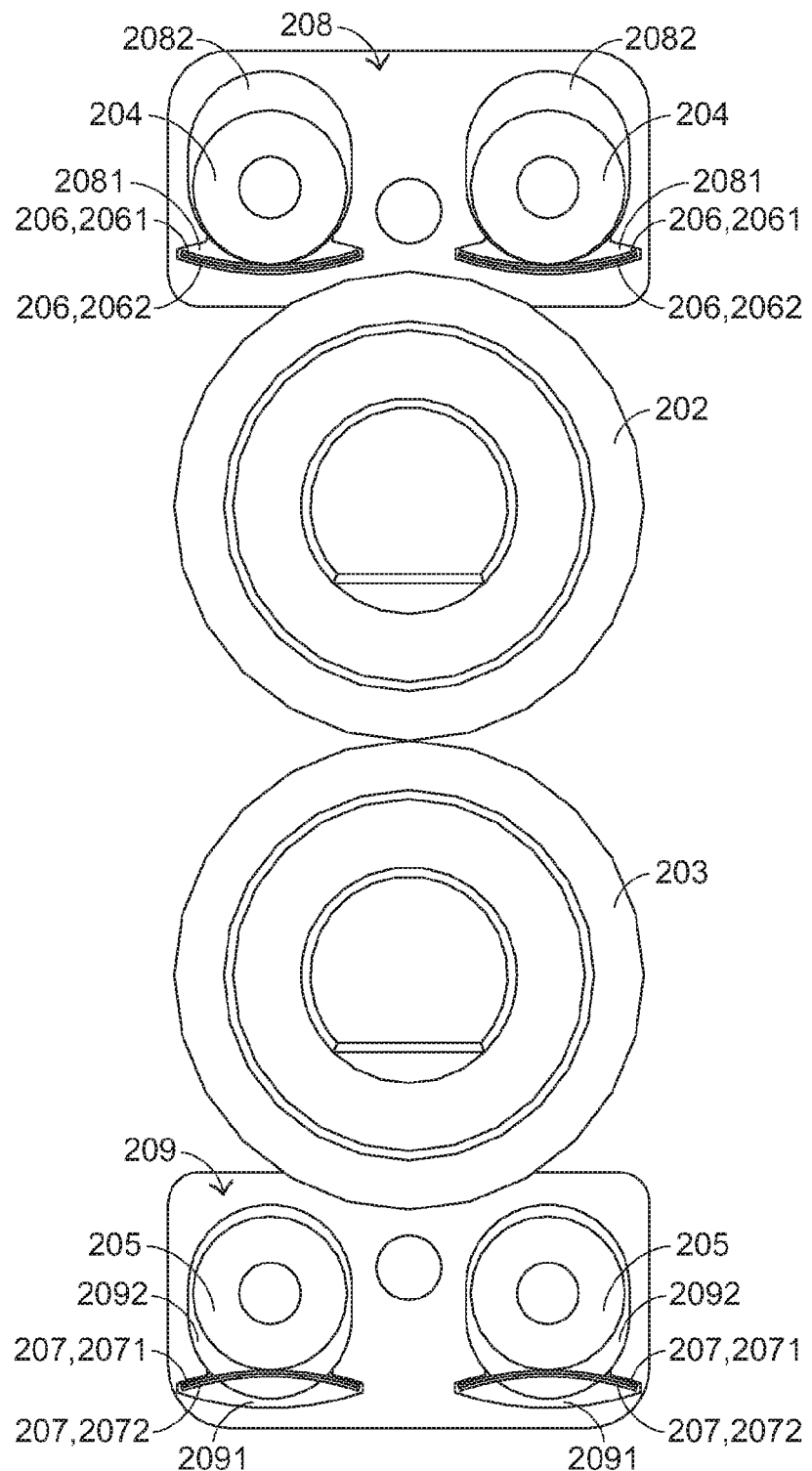
FIG. 4 schematically illustrates the hot laminating apparatus of FIG. 2 prior to a preheating status.
Figure 5:
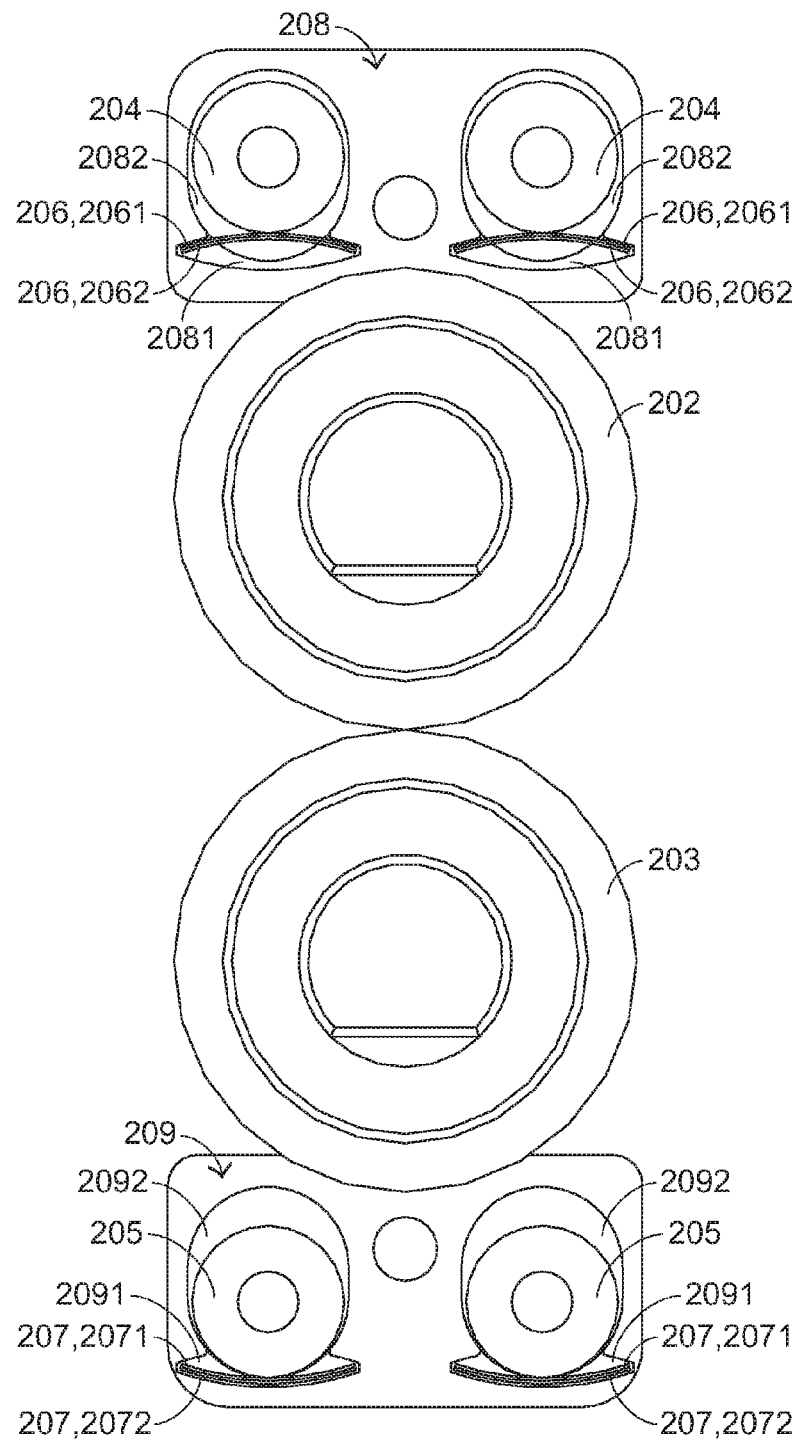
FIG. 5 schematically illustrates the hot laminating apparatus of FIG. 2 posterior to the preheating status.

FIG. 4 schematically illustrates the hot laminating apparatus of FIG. 2 prior to a preheating status. FIG. 5 schematically illustrates the hot laminating apparatus of FIG. 2 posterior to the preheating status. Please refer to FIGS. 4 and 5. Each of the first bimetallic structures 206 comprises a first metal layer 2061 and a second metal layer 2062, which are stacked on each other. The thermal expansion coefficient of the first metal layer 2061 is lower than the thermal expansion coefficient of the second metal layer 2062. As the ambient temperature changes, the first metal layer 2061 and the second metal layer 2062 expand or shrink at different rates. Consequently, the first bimetallic structure 206 may be subjected to deformation and bent upwardly or downwardly. Moreover, each of the second bimetallic structures 207 comprises a third metal layer 2071 and a fourth metal layer 2072, which are stacked on each other. The thermal expansion coefficient of the third metal layer 2071 is lower than the thermal expansion coefficient of the fourth metal layer 2072. As the ambient temperature changes, the third metal layer 2071 and the fourth metal layer 2072 expand or shrink at different rates. Consequently, the second bimetallic structure 207 may be subjected to deformation and bent upwardly or downwardly. In this embodiment, the first metal layer 2061 and the third metal layer 2071 are made of the same material, and the second metal layer 2062 and the fourth metal layer 2072 are made of the same material, but are not limited thereto.

Moreover, two ends of each first heating element 204 are supported by two first bimetallic structures 206, respectively. The second metal layer 2062 of each first bimetallic structure 206 is arranged between the first metal layer 2061 and the first pressing roller 202. Similarly, two ends of each second heating element 205 are supported by two second bimetallic structures 207, respectively. The third metal layer 2071 of each second bimetallic structure 207 is arranged between the fourth metal layer 2072 and the second pressing roller 203.

Moreover, the two first brackets 208 are fixed on the inner sides of the first frame 2011 and the second frame 2012, respectively. Each of the first brackets 208 comprises two first receiving recesses 2081 and two first perforations 2082. The first receiving recesses 2081 are used for accommodating the first bimetallic structures 206. An end of the first heating element 204 is penetrated through the corresponding first perforation 2082 and movable within the corresponding first perforation 2082 upwardly or downwardly.

Moreover, the two second brackets 209 are fixed on the inner sides of the first frame 2011 and the second frame 2012, respectively. Each of the second brackets 209 comprises two second receiving recesses 2091 and two second perforations 2092. The second receiving recesses 2091 are used for accommodating the second bimetallic structures 207. An end of the second heating element 205 is penetrated through the corresponding second perforation 2092 and movable within the corresponding second perforation 2092 upwardly or downwardly.

Before the hot laminating apparatus 2 is enabled, each of the first bimetallic structures 206 is bent as an upward smiling curve, and each of the second bimetallic structure 207 is bent as a downward smiling curve (see FIG. 2). After the hot laminating apparatus 2 is enabled, the heat energy generated by the first heating element 204 is transferred to the corresponding first bimetallic structure 206, and thus the temperature of the corresponding first bimetallic structure 206 is gradually increased. When the temperature of the first bimetallic structure 206 reaches its critical temperature, the first bimetallic structure 206 deforms as the downward smiling curve (see FIG. 5). Similarly, since the heat energy generated by the second heating element 205 is transferred to the corresponding second bimetallic structure 207, the temperature of the corresponding second bimetallic structure 207 is gradually increased. When the temperature of the second bimetallic structure 207 reaches its critical temperature, the second bimetallic structure 207 deforms as the upward smiling curve (see FIG. 5).

Please refer to FIGS. 4 and 5 again. Before the hot laminating apparatus 2 is enabled, the first heating element 204 supported by the first bimetallic structure 206 is closer to the first pressing roller 202, and the second heating element 205 supported by the second bimetallic structure 207 is closer to the second pressing roller 203. Consequently, in the early preheating stage of the hot laminating apparatus 2, the heat energy generated by the first heating element 204 and the heat energy generated by the second heating element 205 can be quickly received by the first pressing roller 202 and the second pressing roller 203, respectively. In other words, the temperature of the first pressing roller 202 and the temperature of the second pressing roller 203 can be quickly increased.

During the process of preheating the hot laminating apparatus 2, each first bimetallic structure 206 and each second bimetallic structure 207 are subjected to deformation. Consequently, when the temperature of the first bimetallic structure 206 reaches its critical temperature, the first heating element 204 supported by the first bimetallic structure 206 is moved away from the first pressing roller 202. Similarly, when the temperature of the second bimetallic structure 207 reaches its critical temperature, the second heating element 205 supported by the second bimetallic structure 207 is moved away from the second pressing roller 203. Consequently, when the sheet article sandwiched between the two thermoplastic films is fed into the transmission channel 215, the first heating element 204 will not be compressed by the upwardly-moved first pressing roller 202. Similarly, since the second heating element 205 is moved downwardly, when the sheet article sandwiched between the two thermoplastic films is fed into the transmission channel 215, the second heating element 205 will not be compressed by the downwardly-moved second pressing roller 203.

As mentioned above, when the temperature of the second bimetallic structure 207 reaches its critical temperature, the second heating element 205 supported by the second bimetallic structure 207 is further away from the second pressing roller 203. Consequently, even if the thermoplastic films are drawn toward the second heating element 205 by the second pressing roller 203, the possibility of resulting in direct contact between the thermoplastic films and the second heating element 205 will be eliminated. Under this circumstance, the hazardous events (e.g. smoking events or firing events) will be avoided.

From the above discussions, the distance between the first pressing roller 202 and the first heating element 204 and the distance between the second pressing roller 203 and the second heating element 205 can be shortened in the early stage of enabling the hot laminating apparatus 2. Consequently, the preheating speed of the hot laminating apparatus 2 is enhanced. Moreover, by the hot laminating apparatus 2 of the present invention, the first heating element 204 will not be compressed by the upwardly-moved first pressing roller 202 and/or the second heating element 205 will not be compressed by the downwardly-moved second pressing roller 203. Under this circumstance, the occurrence of the hazardous events will be avoided. Consequently, the hot laminating apparatus of the present invention has industrial applicability.

By the way, in accordance with an electronic control mechanism (e.g. a motor), the first heating element 204 may be controlled to be moved toward or away from the first pressing roller 202 and the second heating element 205 may be controlled to be moved toward or away from the second pressing roller 203. However, the use of the electronic control mechanism may increase the fabricating cost of the hot laminating apparatus 2 in comparison with the technology of the present invention.

In the above embodiment, the structures of the hot laminating apparatus 2 are presented herein for purpose of illustration and description only. However, those skilled in the art will readily observe that numerous modifications and alterations may be made while retaining the teachings of the invention. For example, in a variant example, the heat energy generated by the heating element is provided to only one of the first pressing roller 202 and the second pressing roller 203 of the hot laminating apparatus 2. Alternatively, in a variant example, the hot laminating apparatus 2 is equipped with a single first heating element 204 to provide heat energy to the first pressing roller 202, or the hot laminating apparatus 2 is equipped with a single second heating element 205 to provide heat energy to the second pressing roller 203. Alternatively, in a variant example, plural first heating elements 204 are supported by a single first bimetallic structure 206, or plural second heating elements 205 are supported by a single second bimetallic structure 207. Alternatively, in a variant example, the first brackets 208 and the second brackets 209 are not fixed on the first frame 2011 and the second frame 2012, but fixed on other components.

Moreover, in a variant example, each first bimetallic structure 206 is a non-curved structure (e.g. a flat structure) and each second bimetallic structure 207 is also a non-curved structure (e.g. a flat structure) before the hot laminating apparatus 2 is enabled. That is, during the process of preheating the hot laminating apparatus 2, each first bimetallic structure 206 is switched from the non-curved structure (e.g. the flat structure) to a downward smiling curve, and each second bimetallic structure 207 is switched from the non-curved structure (e.g. the flat structure) to an upward smiling curve. Alternatively, in a variant example, during the process of preheating the hot laminating apparatus 2, each first bimetallic structure 206 is switched from the upward smiling curve to a non-curved structure (e.g. a flat structure), and each second bimetallic structure 207 is switched from the is switched from the downward smiling curve downward smiling curve to a non-curved structure (e.g. a flat structure). The above variant examples may be combined with each other to expand the applications of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A hot laminating apparatus, comprising:
   a main body comprising a first frame and a second frame, wherein said first frame and said second frame are opposed to each other;
   a first pressing roller, wherein two ends of said first pressing roller are pivotally coupled to said first frame and said second frame, respectively;
   a second pressing roller opposed to said first pressing roller, wherein two ends of said second pressing roller are pivotally coupled to said first frame and said second frame, respectively, wherein said first pressing roller and said second pressing roller are rotated in reverse directions, wherein when two thermoplastic films and a sheet article between said two thermoplastic films are transmitted through a region between said first pressing roller and said second pressing roller, said two thermoplastic films and said sheet article are laminated by said first pressing roller and said second pressing roller;
   at least one first heating element located beside said first pressing roller for providing heat energy to said first pressing roller; and
   at least one first bimetallic structure arranged between said at least one first heating element and said first pressing roller, wherein in response to said heat energy provided by said at least one first heating element, said at least one first bimetallic structure is subjected to deformation to allow said at least one first heating element to be away from said first pressing roller.

2. The hot laminating apparatus according to claim 1, further comprising at least one first bracket, wherein said at least one first bracket is fixed on said first frame or said second frame, and said at least one first bracket comprises a first receiving recess for accommodating said at least one first bimetallic structure.

3. The hot laminating apparatus according to claim 2, wherein said first heating element is a heat pipe, and said at least one first bracket further comprises a first perforation, wherein an end of said heating pipe is penetrated through said first perforation and movable within said first perforation.

4. The hot laminating apparatus according to claim 1, further comprising a first heat shield for enclosing said at least one first heating element and a part of said first pressing roller.

5. The hot laminating apparatus according to claim 1, wherein said first pressing roller is disposed over said second pressing roller, and said first bimetallic structures comprises a first metal layer and a second metal layer, which are stacked on each other, wherein said second metal layer is arranged between said first metal layer and said first pressing roller, and a thermal expansion coefficient of said second metal layer is higher than that of said first metal layer.

6. The hot laminating apparatus according to claim 5, further comprising:
   at least one second heating element located beside said second pressing roller for providing heat energy to said second pressing roller; and
   at least one second bimetallic structure arranged between said at least one second heating element and said second pressing roller, wherein in response to said heat energy provided by said at least one second heating element, said at least one second bimetallic structure is subjected to deformation to allow at least one said second heating element to be away from said second pressing roller.

7. The hot laminating apparatus according to claim 6, further comprising at least one second bracket, wherein said at least one second bracket is fixed on said first frame or said second frame, and said at least one second bracket comprises a second receiving recess for accommodating said at least one second bimetallic structure.

8. The hot laminating apparatus according to claim 7, wherein said second heating element is a heat pipe, and said at least one second bracket further comprises a second perforation, wherein an end of said heating pipe is penetrated through said second perforation and movable within said second perforation.

9. The hot laminating apparatus according to claim 6, further comprising a second heat shield for enclosing said at least one second heating element and a part of said second pressing roller.

10. The hot laminating apparatus according to claim 6, wherein said second bimetallic structure comprises a third metal layer and a fourth metal layer, which are stacked on each other, wherein said third metal layer is arranged between said fourth metal layer and said second pressing roller, wherein a thermal expansion coefficient of said fourth metal layer is higher than that of said third metal layer.

11. The hot laminating apparatus according to claim 10, wherein said first metal layer and said third metal layer are made of the same material, and said second metal layer and said fourth metal layer are made of the same material.

12. The hot laminating apparatus according to claim 1, further comprising a driving motor, wherein said driving motor is fixed on said first frame for driving rotations of said first pressing roller and said second pressing roller.

* * * * *